United States Patent
Hirata et al.

(10) Patent No.: US 7,459,416 B2
(45) Date of Patent: Dec. 2, 2008

(54) FLUID BEARING UNIT AND SPINDLE MOTOR USING THE SAME

(75) Inventors: Katsushi Hirata, Oozu (JP); Takanori Shiraishi, Oozu (JP)

(73) Assignee: Panasonic Corporation, Osaka (JP)

( * ) Notice: Subject to any disclaimer, the term of this patent is extended or adjusted under 35 U.S.C. 154(b) by 666 days.

(21) Appl. No.: 10/887,855

(22) Filed: Jul. 12, 2004

(65) Prior Publication Data

US 2006/0008189 A1 Jan. 12, 2006

(51) Int. Cl.
*C10M 105/38* (2006.01)
*F16C 32/06* (2006.01)

(52) U.S. Cl. .......... 508/485; 384/100; 310/90; 310/90.5

(58) Field of Classification Search .......... 508/485
See application file for complete search history.

(56) References Cited

U.S. PATENT DOCUMENTS

| | | | | |
|---|---|---|---|---|
| 2,766,266 A | * | 10/1956 | Emerson et al. ........... 554/228 |
| 5,627,147 A | * | 5/1997 | Hayakawa et al. ......... 508/501 |
| 5,629,274 A | * | 5/1997 | Hayakawa et al. ......... 508/485 |
| 6,023,114 A | * | 2/2000 | Mori et al. ................ 310/90 |
| 6,335,310 B1 | * | 1/2002 | Suekuni et al. ............ 508/409 |
| 6,617,289 B2 | * | 9/2003 | Memita et al. ............. 508/485 |
| 6,903,056 B2 | * | 6/2005 | Nagano et al. ............. 508/496 |
| 7,147,376 B2 | * | 12/2006 | Shimizu et al. ............ 384/107 |
| 7,176,167 B2 | * | 2/2007 | Akiyama et al. ........... 508/108 |
| 7,249,363 B2 | * | 7/2007 | Noda et al. ................ 720/721 |

FOREIGN PATENT DOCUMENTS

| JP | 2000063860 A | 2/2000 |
|---|---|---|
| JP | 2001316687 A | 11/2001 |

* cited by examiner

*Primary Examiner*—Ellen M. McAvoy
(74) *Attorney, Agent, or Firm*—Steptoe & Johnson LLP

(57) ABSTRACT

The present invention provides a fluid bearing unit capable of achieving lower torque and lower current consumption in comparison with a conventional bearing unit, and a spindle motor using the same. The present invention employs an ester derived from 1,5-pentanediol having one alkyl side chain and saturated monovalent fatty acid having 5 to 8 carbon atoms as a base oil of a lubricant with which a gap between a shaft and a sleeve is filled.

6 Claims, 1 Drawing Sheet

FLUID BEARING UNIT AND SPINDLE MOTOR USING THE SAME

BACKGROUND OF THE INVENTION

1. Field of the Invention

The present invention relates to a dynamic pressure-type fluid bearing unit used in a rotator device such as a magnetic disc drive, and a spindle motor using the same. More particularly, the present invention relates to a fluid bearing unit having a feature in means for reducing bearing torque and motor current consumption.

2. Description of the Related Art

A fluid bearing unit comprises a shaft and a bearing for receiving the shaft. As the fluid bearing unit rotates, a lubricant in a gap between the shaft and the bearing is collected by dynamic pressure generating grooves formed in one of the shaft and the bearing, so that pressure is generated in the gap and the shaft is supported by the bearing in a non-contact manner.

A spindle motor provided with the fluid bearing unit is excellent in rotational accuracy which is indispensable in improving the recording density of a medium, impact resistance and noise reduction. Therefore, the spindle motor is mainly used for a driving device, typically, a magnetic disc drive of information equipment and AV equipment.

Recently, the spindle motor has a strong demand of reduction in motor current consumption, particularly, reduction in torque of the fluid bearing unit constituting most of the current consumption in view of miniaturization and energy-saving of the equipment. The torque of the fluid bearing unit is proportional to the viscosity of a lubricant to be filled; therefore, the lubricant having lower viscosity becomes necessary. Consequently, an ester derived from neopentyl glycol and monovalent fatty acid having 6 to 12 carbon atoms and/or derivatives thereof is used as a base oil which constitutes a main component of the lubricant (see, for example, JP2001-316687 A). Further, a fluid bearing unit using monoester and the like is proposed (see, for example, JP2000-63860 A).

However, the conventional fluid bearing unit using such lubricant has a problem in that it can not sufficiently achieve the torque reduction as desired since the size of the bearing involved in miniaturization is limited.

Further, in the case of using a monoester-based lubricant, the torque reduction in the bearing can be achieved. However, since the monoester-based lubricant normally has a high pour point, there is a possibility in that the fluidity may be lost at a temperature of 0° C., moreover, at a low temperature region of not more than −20° C. and the lubricant may be solidified. In the case of using the lubricant in a fluid bearing unit for portable equipment or in-vehicle equipment, the necessary torque of the bearing becomes considerably high under the necessary environment of not more than −40° C., so that there is a problem in that the bearing unit cannot be rotationally activated and the range of the operating temperature is limited.

SUMMARY OF THE INVENTION

The present invention is made to solve the above problems, and it is an object of the present invention to provide a fluid bearing unit capable of being rotationally activated at lower torque even in an extremely low temperature region, and a spindle motor using the same.

In the fluid bearing unit and the spindle motor using the same according to the present invention, a lubricant contains, as a base oil, an ester derived from 1,5-pentanediol having one alkyl side chain and saturated monovalent fatty acid having 5 to 8 carbon atoms.

According to the present invention, since an ester having low viscosity and excellent low temperature fluidity is used as the base oil of the lubricant, it is possible to realize a fluid bearing unit capable of being rotationally activated at lower torque even in an extremely low temperature region of not more than −40° C., and a spindle motor using the same.

According to a first aspect of the present invention, a fluid bearing unit, in which dynamic pressure generating grooves are formed in at least one of a shaft and a sleeve, and a gap between the shaft and the sleeve is filled with a lubricant, has features in that the lubricant contains, as a base oil, an ester derived from 1,5-pentanediol having one alkyl side chain and saturated monovalent fatty acid having 5 to 8 carbon atoms, and the gap is a radial gap of 1 to 5 µm in diameter. With this configuration of the present invention, since the base oil of the lubricant has low viscosity and the gap is a radial gap which corresponds to the viscosity of the base oil, it is possible to realize a fluid bearing unit which is excellent in heat resistance at lower torque without reducing bearing stiffness.

According to a second aspect of the present invention, a fluid bearing unit, in which dynamic pressure generating grooves are formed in at least one of a shaft and a sleeve, and a gap between the shaft and the sleeve is filled with a lubricant, has a feature in that the lubricant contains, as a base oil, a mixture of not less than two kinds of esters derived from 1,5-pentanediol having one alkyl side chain and saturated monovalent fatty acid having 5 to 8 carbon atoms. With this configuration of the present invention, the base oil of the lubricant is a mixture of not less than two kinds of esters each having different molecular structure. Therefore, the base oil is less susceptible to crystallization in comparison with a single-structured ester, the low temperature fluidity of the lubricant can be further improved, and the fluid bearing unit can be easily rotationally activated even in an extremely low temperature region of not more than −40° C.

According to a third aspect of the present invention, a fluid bearing unit, in which dynamic pressure generating grooves are formed in at least one of a shaft and a sleeve and, a gap between the shaft and the sleeve is filled with a lubricant, has a feature in that the lubricant contains, as a base oil, a mixture of an ester derived from 1,5-pentanediol having one alkyl side chain and saturated monovalent fatty acid having 5 to 8 carbon atoms and polyolester and/or diester. With this configuration of the present invention, when small amount of polyolester or diester having excellent low temperature fluidity is added to the base oil of the lubricant, increase of viscosity can be suppressed and low temperature fluidity can be largely improved. Therefore, the fluid bearing unit can be easily rotationally activated even in an extremely low temperature region of not more than −40° C. without greatly increasing the bearing torque.

According to a fourth aspect of the present invention, in the fluid bearing unit according to any one of the first to third aspects, the alkyl side chain is a methyl group. With this configuration of the present invention, since the methyl group can obtain an ester having small molecular weight and low viscosity, it is possible to realize a fluid bearing unit capable of corresponding to lower torque.

According to a fifth aspect of the present invention, in the fluid bearing unit according to any one of the first to third aspects, the 1,5-pentanediol having one alkyl side chain is a 3-methyl-1,5-pentanediol. With this configuration of the present invention, when 3-methyl-1,5-pentanediol is used as an alcoholic component, it is possible to realize a fluid bearing unit which is excellent in heat resistance at lower torque.

According to a sixth aspect of the present invention, in the fluid bearing unit according to any one of the first to third aspects, the saturated monovalent fatty acid is of a straight chain type. With this configuration of the present invention, the straight chain-type saturated monovalent fatty acid has small viscosity temperature change and is excellent in a lubrication performance in comparison with a branched chain-type saturated monovalent fatty acid. Therefore, the temperature change in torque can be made smaller, and friction and wear of the bearing material can be suppressed.

According to a seventh aspect of the present invention, in the fluid bearing unit according to any one of the first to third aspects, the shaft is made of martensitic stainless steel of 2 to 4 mm in diameter. With this configuration of the present invention, since corrosion of the shaft due to non-reactants, i.e., acid does not occur during ester synthesis, the reliability of the fluid bearing unit becomes higher. In addition, since the diameter of the shaft corresponds to the viscosity of the base oil, the necessary bearing stiffness can be easily attained.

According to an eighth aspect of the present invention, in the fluid bearing unit according to any one of the first to third aspects, the number of foreign matters, which are included in the lubricant and are larger in size than the minimum dimension of the gap, is not more than 1000. With this configuration of the present invention, since the number of the foreign matters included in the lubricant is small, the increase and fluctuation of the torque becomes small, and the locking of the bearing does not occur.

According to a ninth aspect of the present invention, a spindle motor comprises the fluid bearing unit according to any one of the first to third aspects. With this configuration of the present invention, it is possible to realize a spindle motor having low motor current consumption.

DESCRIPTION OF THE PREFERRED EMBODIMENTS

First Embodiment

Figure 1:
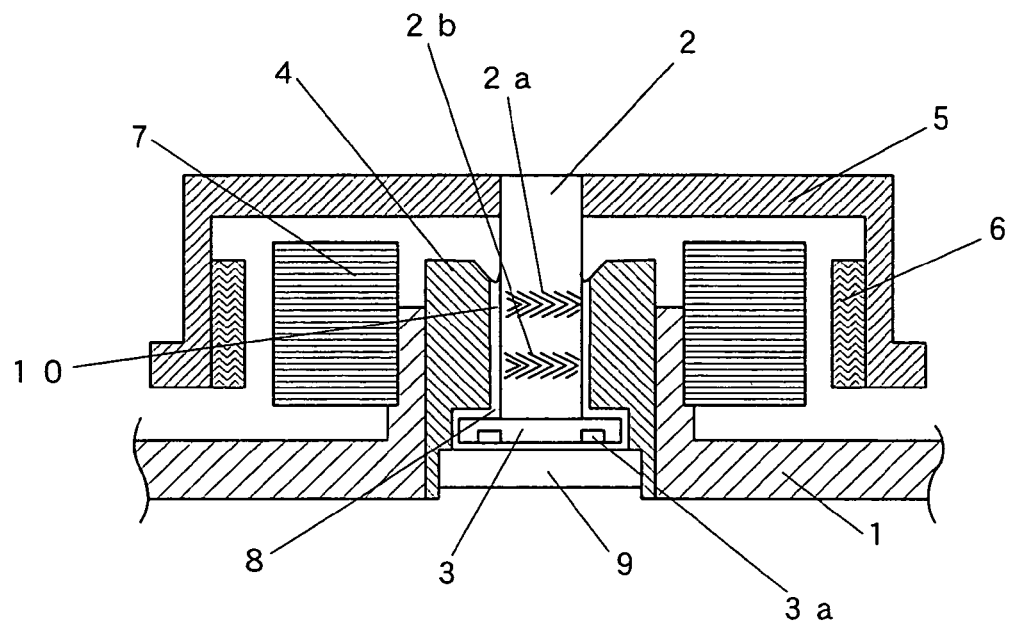
FIG. 1 is a cross sectional view of a spindle motor provided with a fluid bearing unit according to a second embodiment of the present invention.

A fluid bearing unit according to first to eighth aspects of the present invention will now be described with reference to FIG. 2.

A shaft part has a configuration in that a thrust flange 3 is fixed to one end of a shaft 2 having an outer peripheral surface on which herringbone-shaped dynamic pressure generating radial grooves 2a, 2b are formed, and the other end of the shaft 2 is pressed and fixed to a base 1a.

The shaft part is inserted into a bearing hole of a sleeve 4. A thrust plate 9 is attached to the sleeve 4 so as to cover one side of the bearing hole and to face to the thrust flange 3. Further, spiral-shaped dynamic pressure generating thrust grooves 3a are formed on the surface of the thrust flange 3, which faces to the thrust plate 9. A gap between the bearing hole and the shaft part is filled with a lubricant 8.

Figure 2:
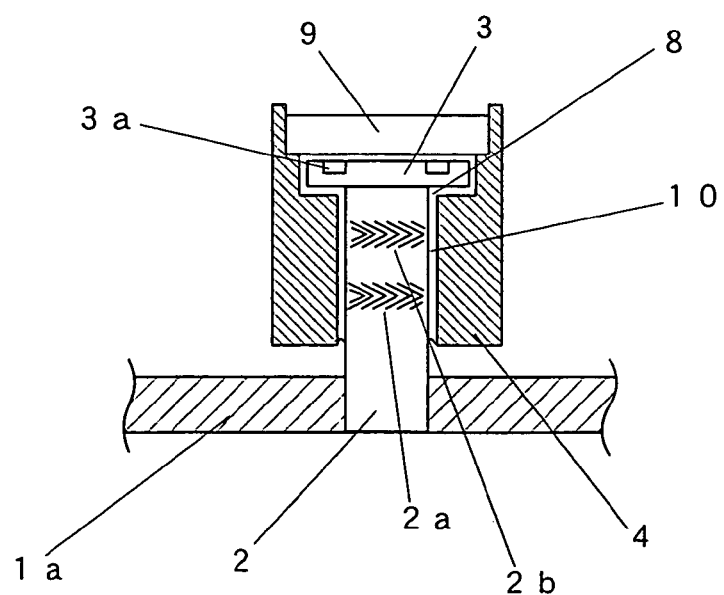
FIG. 2 is a cross sectional view of a fluid bearing unit according to a first embodiment of the present invention.

As the sleeve 4 rotates, the lubricant 8 is collected by the dynamic pressure generating radial grooves 2a, 2b formed on the shaft 2 and pressure is generated at a radial gap 10 between the shaft 2 and the sleeve 4, so that the sleeve 4 is supported by the shaft 2 in a non-contact manner in a radial direction (horizontal direction in FIG. 2). The lubricant 8 is further collected by the dynamic pressure generating thrust grooves 3a and pressure is generated in a thrust direction (vertical direction in FIG. 2), so that the thrust plate 9 floats and is supported by the thrust flange 3 in a non-contact manner.

An ester derived from 1,5-pentanediol having one alkyl side chain and saturated monovalent fatty acid having 5 to 8 carbon atoms is used as a base oil of the lubricant 8. As a result, the fluid bearing unit can rotate at lower torque in comparison with the conventional bearing unit.

The synthesis of the ester to be used as the base oil can be carried out by a known esterification reaction of a predetermined alcoholic component and an acid component with/without a catalyst.

With respect to the 1,5-pentanediol having one alkyl side chain, which is the alcoholic component, the alkyl side chain is preferably a lower alkyl group such as a methyl group, an ethyl group or a propyl group. In particular, the methyl group is more preferable. The pentanediol having one methyl group side chain has small molecular weight, and thus has low viscosity, enabling the reduction in the bearing torque. Specific examples of the pentanediol having one methyl group side chain may include 2-methyl-1,5-pentanediol, 3-methyl-1,5-pentanediol and the like. The latter is preferable in terms of achieving excellent heat resistance at lower torque.

Since the saturated monovalent fatty acid having 5 to 8 carbon atoms, which is the acid component, does not contain unsaturated bonds, it has high heat and oxidation stability, is less likely to deteriorate even under high temperature environment and rapid rotation, and allows longer life span of the fluid bearing unit. Therefore, it is more preferable than unsaturated monovalent fatty acid. If the saturated monovalent fatty acid has not more than 4 carbon atoms, the bearing achieves lower torque but has low heat resistance; thus, long-term reliability of the unit can not be achieved. If the saturated monovalent fatty acid has not less than 9 carbon atoms, the viscosity becomes greater; thus, reduction of bearing torque can not be expected and, further, solidification may occur at the temperature of around −30° C. Therefore, the fluid bearing unit can not be rotationally activated at −40° C.

The acid component may be a straight-chain type or a branched-chain type. Specific examples thereof may include n-pentanoic acid, n-hexanoic acid, n-heptanoic acid, n-octanoic acid, iso-pentanoic acid, neo-pentanoic acid, iso-hexanoic acid, iso-heptanoic acid, iso-octanoic acid, 2-ethyl hexanoic acid and the like. In particular, the straight-chain type is more preferable than the branched type because of the following reasons: it has lower viscosity, can suppress the viscosity-temperature change to be small, and has good lubrication performance; thus, the temperature variation of the bearing torque and the torque can be made small, and the friction as well as wear of the bearing can be suppressed. Specifically, n-pentanoic acid, n-hexanoic acid, n-heptanoic acid and n-octnoic acid are preferable.

Further, in terms of heat resistance, n-hexanoic acid, n-heptanoic acid and n-octanoic acid are more preferable.

A mixture of two or more kinds of ester derived from 1,5-pentanediol having one alkyl side chain and saturated monovalent fatty acid having 5 to 8 carbon atoms is preferably used as the base oil of the lubricant 8 of the present invention because it improves the low temperature fluidity. More specifically, the mixture can be obtained by mixing two or more kinds of single structured ester synthesized from one kind of alcoholic component and one kind of acid component.

If the ester is synthesized from one kind of alcoholic component and two kinds of acid components, two kinds of single structured ester in which only one kind of acid component is bonded in one molecule of ester, and one kind of mixture structured ester in which two kinds of acid components are bonded in one molecule of ester; thus, a total of three kinds of ester mixture are derived.

The base oil of the lubricant 8 of the present invention may also be prepared by mixing another kind of base oil serving as an additive base oil with the ester derived from 1,5-pentanediol having one alkyl side chain and saturated monovalent fatty acid having 5 to 8 carbon atoms. The additive base oil can be appropriately selected in accordance with the purpose such as to further reduce viscosity, to add or complement another function and the like. Specific examples of the additive base oil may include a known compound such as mineral oil, poly α olefin, alkyl aromatic, polyglycol, phenyl ether, polyolester, diester, phosphate ester and the like. One kind of or two or more kinds of additive base oils may be combined. Above all, polyolester and diester are preferable because low viscosity can be obtained, good low temperature fluidity can be achieved, and high heat resistance can also be achieved. Among the polyolester, ester comprising neopentyl glycol as the alcoholic component and saturated monovalent fatty acid having 6 to 10 carbon atoms as the acid component can achieve lower torque and has good low temperature fluidity. Further, among the diester, di(2-ethylhexyl)adipate, diisononyl adipate, diisodecyl adipate, di(2-ethylhexyl)azelate, di(2-ethylhexyl)sebacate are most preferable since they have lower viscosity and high versatility, enabling reduction of the bearing torque and further cost reduction. Alternatively, an ester derived from 1,5-pentanediol having one alkyl side chain and saturated monovalent fatty acid having 5 to 8 carbon atoms may serve as the additive base oil and may be mixed with the polyolester and diester.

With respect to the lubricant 8, an additive may also be blended in addition to the base oil. A known compound may be selected as the additive for the purpose of improving and complementing the performance of the base oil. More specifically, one kind of or two or more kinds of oxidation inhibitor, corrosion inhibitor, metal deactivator, oiliness improver, extreme pressure agent, friction modifier, anti-wear agent, viscosity index improver, pour-point depressant, anti-foamer, antistatic agent, detergent-dispersant may be blended. The additive causes gas generation and alteration with deterioration, thus lowering the performance of the bearing and the unit. Therefore, the total amount to be blended must be kept to a minimum.

If the radial gap 10 between the shaft 2 and the sleeve 4 is 1 to 5 μm, more preferably 1.5 to 4 μm, the bearing sufficiently exhibits the effect of low viscosity of the lubricant 8 according to the present invention. The torque is proportional to the reciprocal of the gap, and stiffness is proportional to the reciprocal of the $n^{th}$ power of the gap; therefore, a gap that complies with the viscosity of the lubricant is necessary. Low torque and stiffness necessary for the bearing can be easily obtained within the above mentioned gap range.

If the radial gap is less than 1 μm, the affect of the gap is large even if the lubricant 8 of the present, invention is used, and the effect of reduction of bearing torque can not be obtained. Due to the affect of mixed foreign matter and wear powder produced when stopping, the locking of the bearing can very easily occur, thus lowering the reliability of the unit. Further, since high processing accuracy and assembling accuracy of the shaft and the sleeve is necessary, they become factors of cost increase.

If the radial gap is greater than 5 μm, the effect of low viscosity of the lubricant of the present invention is exhibited, but the influence of the gap becomes greater. As a result, bearing stiffness is lowered and the fluid bearing unit can not be practically used. Further, since the eccentricity ratio of the shaft increases, the surface deflection of the recording medium attached to the shaft or the bearing becomes greater, accuracy of a recording reproducing position is lowered, and variance of signal strength is occurred. As a result, the performance of the equipment can not be satisfied. Since the contacting surface area of the lubricant and the air increases, the degradation of the lubricant is promoted, and the life span of the bearing is shortened. Therefore, the radial gap which is greater than 5 μm is inappropriate.

Further, the shaft 2 is made of martensitic stainless steel of 2 to 4 mm, more preferably 2.5 to 3.5 mm in diameter. In comparison with other materials, the martensitic stainless steel does not cause corrosion of the shaft due to non-reactants during ester synthesis, i.e., acids. The martensitic stainless steel is more rigid than ferritic or austenitic stainless steel, and thus the amount of wear produced is small even with the lubricant 8 of the present invention having low viscosity and small surface protective film function. More specifically, the martensitic stainless steel of SUS 403, SUS 410, SUS 420, SUS 429 and SUS 440 are used. If the shaft diameter is less than 2 mm, the stiffness of the bearing must be higher, the gap must be greatly smaller, and the shaft must be longer. However, smaller gap arise the above mentioned problem, and the shaft length is limited due to miniaturization, and thus the necessary performance can not be satisfied. If the shaft diameter is greater than 4 mm, the stiffness will be higher, but since the torque loss is greater, the effect of the base oil of the lubricant 8 can not be exhibited.

The lubricant 8 of the present invention is filtered and filled into the bearing so that the number of the mixed foreign matters larger in size than the radial gap 10 or the minimum gap between the shaft 2 and the sleeve 4 is not more than 1000. This foreign matters are fine particles or fiber containing components of iron, copper, aluminum, silicon, oxygen and the like, and becomes not only a factor for increasing and fluctuating the torque, but also bonds to the shaft or the sleeve, thus arising a danger of locking the bearing. The foreign matter is preferably made as small as possible. The filtering is performed through pressurization or depressurization filtering with a filter having a hole diameter of not more than the size of the minimum gap dimension.

With regards to the sleeve 4, a material that is less likely to be corroded by acids such as copper alloy, stainless steel, ceramics and resin is used. In terms of wear resistance, processing and cost, copper alloy and stainless steel are most preferable. A surface modification may be performed on one part of the surface or the entire surface of the sleeve material by means of, for example, electroplating method, physical deposition method, chemical deposition method and diffusion coating method.

The dynamic pressure generating radial grooves 2a, 2b are formed on the outer peripheral surface of the shaft 2, but may also be formed on the bearing hole surface of the sleeve 4, or on both the outer peripheral surface of the shaft 2 and the bearing hole surface of the sleeve 4. The dynamic pressure generating thrust grooves 3a may be formed on only the surface of the thrust flange 3 facing the thrust plate 9, only on the surface on the thrust plate side facing the thrust flange 3, only on the back surface of the thrust flange 3, or on more than two places of the above mentioned three places.

Similar advantages can be achieved with dynamic pressure generating radial and thrust grooves of herringbone shape or spiral shape.

In the embodiment of the present invention, one end of the shaft part is fixed, but when fixing both ends, or when both ends of the bearing hole of the sleeve are not blocked, similar advantages can still be achieved.

According to the present invention described above, since an ester derived from 1,5-pentanediol having one alkyl side chain and saturated monovalent fatty acid having 5 to 8 carbon atoms is used as the base oil for the lubricant of the fluid bearing unit, the fluid bearing unit having lower torque than the conventional bearing unit is obtained. Further, since the fluid bearing unit can be rotationally activated even in an extremely low temperature region of not more than −40° C., the operating temperature range of the fluid bearing unit is wider.

Second Embodiment

A spindle motor provided with a fluid bearing unit according to a ninth aspect of the present invention will now be described with reference to FIG. 1. Here, like reference characters designate corresponding parts of the fluid bearing unit of FIG. 2 according to the first embodiment, and thus the detailed description thereof is omitted. The fluid bearing unit of FIG. 1 differs from the fluid bearing unit of FIG. 2 in that the shaft fixation is modified to shaft rotation, and the dynamic pressure generating thrust grooves are a herringbone shape.

A thrust flange 3 is fixed to one end of a shaft 2 having an outer peripheral surface on which herringbone-shaped dynamic pressure generating grooves 2a, 2b are formed and a hub 5 for attaching a magnetic disc is pressed to the other end of the shaft 2, so that a rotating part is formed. A sleeve 4 for receiving the rotating part is pressed into a base 1, where a thrust plate 9 is attached on one end of the sleeve 4, thus forming a fixed part. A shaft part is inserted into a bearing hole of the sleeve 4 so that the thrust plate 9 and the thrust flange 3 are arranged to face each other, and herringbone-shaped dynamic pressure generating thrust grooves 3a are formed on a surface of the thrust flange 3 facing to the thrust plate 9. A gap between the bearing hole and the shaft part is filled with a lubricant 8; thus, a bearing device is formed.

A stator coil 7 is provided on an outer peripheral portion of a tubular wall formed in the base 1, a rotor magnet 6 is attached to an inner peripheral surface of the hub 5 so as to face to the stator coil 7; thus, a motor driving part is configured.

When the rotating part is rotatably driven by the motor driving part, dynamic pressure is generated at the lubricant 8 in both the radial direction and the thrust direction similar to the first embodiment, and the rotating part and the fixed part are rotationally supported in a non-contact manner.

EXAMPLES

A spindle motor of the present invention will now be described in detail by way of examples and comparative examples.

Example 1

An ester derived from 3-methyl-1,5-pentanediol and n-heptanoic acid was used as a base oil.

Example 2

An ester derived from 3-methyl-1,5-pentanediol and n-octanoic acid was used as a base oil.

Example 3

A mixture of three kinds of esters derived from 3-methyl-1,5-pentanediol and n-heptanoic acid/n-octanoic acid (molar ratio of 20:80) was used as a base oil.

Example 4

Two kinds of esters: an ester derived from 3-methyl-1,5-pentanediol and n-octanoic acid, and di(2-ethylhexyl)adipate as diester were mixed at a weight ratio of 80:20, and the resultant mixture was used as a base oil.

Comparative Example 1

A mixture of three kinds of polyolesters derived from neopentyl glycol and n-octanoic acid/n-decanoic acid (molar ratio of 50:50) was used as a base oil.

Comparative Example 2

Di(2-ethylhexyl)sebacate as diester was used as a base oil.

Comparative Example 3

Octyl palmitate as a monoester was used as a base oil.

Comparative Example 4

A mixture of three kinds of esters derived from 3-methyl-1,5-pentanediol and n-heptanoic acid/n-octanoic acid (molar ratio of 20:80) was used as a base oil (non-filtered).

The spindle motor was configured to comprise a fluid bearing unit in which a lubricant containing the base oil of each of the above examples and comparative examples was filled, a radial gap between a shaft and a sleeve was 3 μm, the shaft was 3 mm in diameter and was made of martensitic stainless steel, and the sleeve was made of copper alloy. Motor current consumption having spindle speed of 4200 rpm was measured in environments of 0° C. and 20° C. The motor current consumption values of the respective examples and comparative examples were shown, assuming that the motor current consumption at 20° C. of Comparative Example 1 was 100. The measurement results thereof are shown in table 1. Further, the approval/disapproval of rotational activation at each spindle motor in environments of −40° C. and −50° C. was evaluated. The lubricant to be filled was non-filtered only in Comparative Example 4, and in other examples, the lubricant was filtered with a filter having a hole diameter of not more than 3 μm.

TABLE 1

| | Motor current consumption | | Rotational activation | | Torque |
|---|---|---|---|---|---|
| | 0° C. | 20° C. | −40° C. | −50° C. | fluctuation |
| Example 1 | 120 | 80 | ○ | ○ | No |
| Example 2 | 143 | 89 | ○ | X | No |
| Example 3 | 138 | 86 | ○ | ○ | No |

TABLE 1-continued

|  | Motor current consumption | | Rotational activation | | Torque |
| --- | --- | --- | --- | --- | --- |
|  | 0° C. | 20° C. | −40° C. | −50° C. | fluctuation |
| Example 4 | 146 | 90 | ○ | ○ | No |
| Comparative Example 1 | 181 | 100 | ○ | ○ | No |
| Comparative Example 2 | 243 | 122 | ○ | ○ | No |
| Comparative Example 3 | 135 | 87 | X | X | No |
| Comparative Example 4 | 139 | 86 | ○ | ○ | Yes |

As seen from table 1, in each case of Examples 1 to 4, in comparison with each case of Comparative Examples 1 and 2, the motor current consumption was reduced and, further, rotational activation was possible even in an extremely low temperature region of −40° C. With regards to Example 2 using a single ester, rotational activation was not possible at −50° C., but in Examples 3 and 4 using the ester mixture of the present invention as the base oil, rotational activation was possible. With regards to Comparative Example 3, the motor current consumption was lower than each example, but rotational activation at a temperature of not more than −40° C. could not possible at all.

With regards to Comparative Example 4, both the motor current consumption and approval/disapproval of the rotational activation were the same as Example 3, but torque fluctuation occurred.

The lubricant was collected from the spindle motor configured the same way as Examples 1 to 4 and Comparative Examples 1 to 4, and not rotationally activated, and the number of foreign matters of not less than 3 μm was counted in advance. As a result, the number of the foreign matters in Comparative Example 4 was apparently not less than 1000, but in other examples, were filtered to less than 1000.

Thus, it was found that the number of foreign matters is related to the torque fluctuation. Therefore, with the fluid bearing unit and the spindle motor according to the present invention, low torque is achieved, rotational activation even at −40° C. is possible and there is no torque fluctuation.

What is claimed is:

1. A fluid bearing unit for a magnetic disc drive comprising:
a sleeve,
a shaft within said sleeve,
dynamic pressure-generating grooves in at least one surface of said shaft or said sleeve, and
a lubricant filled in a gap between the shaft and the sleeve, wherein
the lubricant contains, as a base oil, an ester derived from 3-methyl-1,5-pentanediol and saturated monovalent fatty acid of a straight chain type having 5 to 8 carbon atoms, and
the gap is a radial gap of 1 to 5 μm in diameter.

2. A fluid bearing unit for a magnetic disc drive comprising:
a sleeve,
a shaft within said sleeve,
dynamic pressure-generating grooves in at least one of said shaft and said sleeve, and
a lubricant filled in a gap between the shaft and the sleeve, wherein
the lubricant contains, as a base oil, a mixture of at least two kinds of esters derived from 3-methyl-1,5-pentanediol and saturated monovalent fatty acid of a straight chain type having 5 to 8 carbon atoms.

3. A fluid bearing unit for a magnetic disc drive comprising:
a sleeve,
a shaft within said sleeve,
dynamic pressure-generating grooves in at least one of said shaft and said sleeve, and
a lubricant filled in a gap between the shaft and the sleeve, wherein
the lubricant contains, as a base oil, a mixture of an ester derived from 3-methyl-1,5-pentanediol and saturated monovalent fatty acid of a straight chain type having 5 to 8 carbon atoms and at least one of polyolester and diester.

4. The fluid bearing unit according to claim 1, wherein the shaft is made of martensitic stainless steel of 2 to 4 mm in diameter.

5. The fluid bearing unit according to claim 1, wherein the number of foreign matters, which are in the lubricant and are larger in size than the minimum dimension of the gap, is not more than 1000.

6. A spindle motor comprising the fluid bearing unit according to claim 1.

* * * * *